United States Patent [19]
Carbrey

[11] 3,742,147
[45] June 26, 1973

[54] TIME DIVISION COMMUNICATION SYSTEM UTILIZING TIME SEPARATION SWITCHING

[75] Inventor: Robert Lawrence Carbrey, Boulder, Colo.

[73] Assignee: Bell Telephone Laboratories, Incorporated, Murray Hill, N.J.

[22] Filed: Feb. 9, 1972

[21] Appl. No.: 224,779

[52] U.S. Cl. .......................... 179/15. AT, 179/15 AA
[51] Int. Cl. .......................... H04j 3/00
[58] Field of Search .......................... 179/15 AT, 15 AA

[56] References Cited

UNITED STATES PATENTS

| | | | |
|---|---|---|---|
| 3,251,946 | 5/1966 | Pfleiderer | 179/15 AA |
| 3,251,947 | 5/1966 | Schlichte | 179/15 AA |

*Primary Examiner*—Ralph D. Blakeslee
*Attorney*—W. R. Keefauver et al.

[57] ABSTRACT

A time division communication system wherein a plurality of time slots occurs in repetitive cycles and each time slot is divided into two time intervals includes a plurality of lines, first and second common buses, and a signal transfer network connected between the common buses. Each line as an associated line circuit which includes a store for storing signals received from the first common bus, means for coupling the stored signal to the connected line and means for selectively connecting the line to the second common bus. The signal transfer network is operative in a first time interval of a selected time slot to receive a sample of the first line circuit stored signal via the first common bus, to receive a sample of the signal on the first line via the second common bus, to form a signal corresponding to the difference in the samples, and to store the difference signal. During a second time interval of the selected time slot, a sample of the stored difference signal is applied to a selected second line circuit store via the first common bus.

11 Claims, 8 Drawing Figures

TIME DIVISION COMMUNICATION SYSTEM UTILIZING TIME SEPARATION SWITCHING

BACKGROUND OF THE INVENTION

My invention relates to communication systems and more particularly to signal transfer arrangements in a time division communication systems.

Time division switching systems permit concurrent exchange of information in a plurality of channels over a common communication link. The information exchange between a pair of lines in a channel occurs in a selected recurring time slot of a repetitive group of time slots. During each repetitive time slot group, pairs of active lines are connected in sequence to the common link in preassigned time slots. In one such time slot, a channel is provided between a pair of selected lines. The information from each line assigned to the connection is sampled and the sampled information signal is exchanged over the common link. The common link is available to other connections during the remaining time slots of the repetitive cycle. As is well known in the art, the signal sampling rate for the lines may be selected to provide an accurate transfer of signals between each selectively connected pair.

In some prior art time division switching systems, a resonant transfer between line associated storage devices is utilized to accomplish an information exchange between a pair of lines in a distinct time slot. This type of transfer requires a resonant network for the information exchange which includes inductive elements and line associated storage capacitors selected for precisely timed signal exchanges. Since the energy exchange is limited to a small portion of each time slot to prevent crosstalk, a relatively large amount of power is needed for each exchange, and only a small portion of the energy transferred lies within the desired information band. Thus, the electronic switches connecting the selected lines in a time slot must have very low losses and must be accurately timed. The conversion of the exchanged information to analog signals in such resonant transfer systems requires a complex filter associated with each storage device to permit maximum transfer of the limited energy in the desired band. It is desirable to provide time division signal transfer arrangements wherein sample signals are transferred directly without the need for an intermediate resonant transfer or other signal transformation and wherein the transferred sample signal is stored so that it is available to the receiving line for a relatively long period.

SUMMARY OF THE INVENTION

My invention is a time division communication system serving a plurality of lines wherein a plurality of time slots occurs in repetitive cycles and each time slot is divided into at least first and second distinct time intervals. The communication system includes first and second common buses, and a signal transfer network connected between said first and second common buses which is adapted to selectively transfer signals between lines. Each line has an associated circuit comprising means for storing signals received from the first common bus, means for coupling the stored signal to said line, and means for selectively connecting said line to the second common bus. In the first time interval of a distinct time slot, the signal from a first line circuit storing means is applied to the first common bus and the signal appearing on the first line including the coupled stored signal and the signal outgoing from said first line is applied to the second common bus. The signal transfer network is operative in said first interval responsive to the signals from the first and second common bus to store a signal corresponding to the first line outgoing signal. In the second time interval of the distinct time slot, the first line outgoing signal stored in the transfer network is applied to the second line storing means via the second common bus.

According to one aspect of the invention, the signal transfer network includes means operative in the first time interval to subtract the signal from the first line circuit storing means applied via the first common bus from twice the signal appearing on the first line applied via the second common bus whereby a signal corresponding to the outgoing signal from the first line is formed. The formed signal is stored in the signal transfer network and is applied therefrom in the second time interval to the storing means of the second line circuit.

According to another aspect of the invention, the signal transfer network includes means operative in the first time interval to store the signal from the first line circuit storing means applied via the first common bus and to store twice the signal applied to said first common bus from the first line. In the second time interval, the stored signal derived from the first line circuit storing means is subtracted from the stored signal derived from the first line and the resulting difference signal which corresponds to the first line outgoing signal is applied to the storing means of the second line circuit.

According to another aspect of the invention, signals are exchanged between first and second lines in a distinct time slot which includes first, second, third and fourth time intervals. During the first time interval, the signal transfer network is responsive to the first line storing means signal on the first common bus and the signal appearing on the first line applied to the second common bus to store a signal corresponding to the outgoing signal from the first line. During the second time interval, the first line outgoing signal stored in the transfer network is applied to the second line storing means. During the third time interval, the signal transfer network is responsive to the second line storing means signal on the first bus and the signal appearing on the second line applied to the second bus to store the second line outgoing signal; and, during the fourth time interval, the second line outgoing signal stored in the transfer network is applied to the first line storing means.

According to yet another aspect of the invention, signals are exchanged between first and second stations in a distinct time slot which includes first, second, third and fourth time intervals. In the first time interval, a signal transfer network is responsive to the first line storing means signal applied to the first bus and the signal on the first line applied to the second bus to store a signal corresponding to the outgoing signal from the first line in a first store. In the second time interval, the signal transfer network is responsive to the second line storing means signal applied to the first bus and the signal on the second line applied to the second bus to store a signal corresponding to the outgoing signal from the second line in a second store. In the third time interval, the signal in the signal transfer network first store is applied to the second line circuit storing means; and, in the fourth time interval, the signal in the signal transfer network second store is applied to the first line circuit storing means.

DETAILED DESCRIPTION

Figure 1:
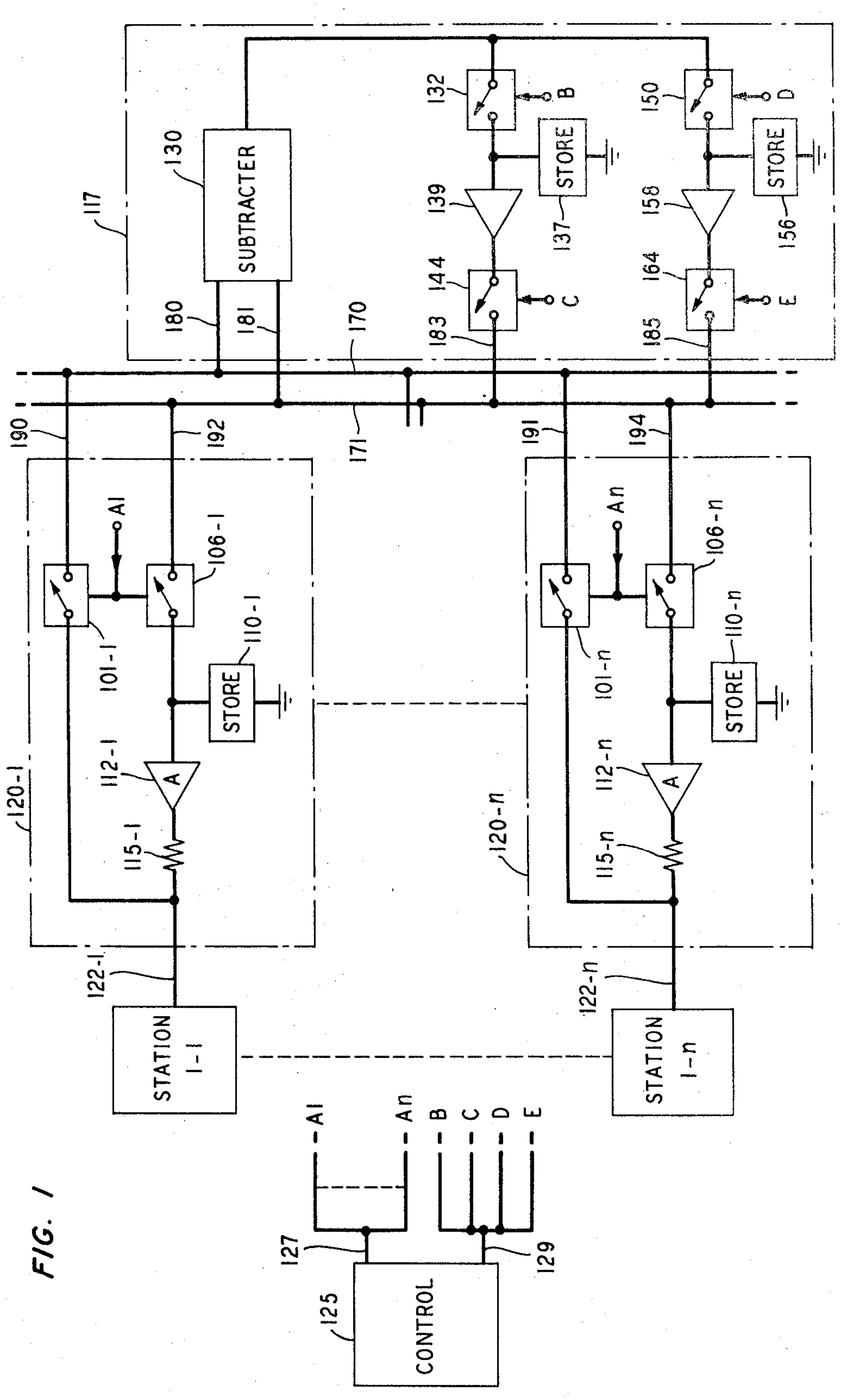
FIG. 1 depicts a general block diagram of a time division communication system illustrative of my invention.

FIG. 1 shows a time division communication system including stations 1-1 through **1-*n*, coupling circuits 120-1 through 120-*n*, common buses 170 and 171 and signal transfer network 117. Coupling circuit 120-1 is connected to station 1-1 via line 122-1 and is also connected to common buses 170 and 171 through leads 190 and 192, respectively. Similarly, coupling circuit 120-*n* is connected to station 1-*n* through line 122-*n* and is further connected to common buses 170 and 171 via leads 191 and 194, respectively. Signal transfer network 117 receives signals from common bus 170 via lead 180 and also receives signals from common bus 171 via lead 181. One output of network 117 is connected to common bus 171 via lead 183, and another output from network 117 is connected to common bus 171 via lead 185**.

Figure 3A:
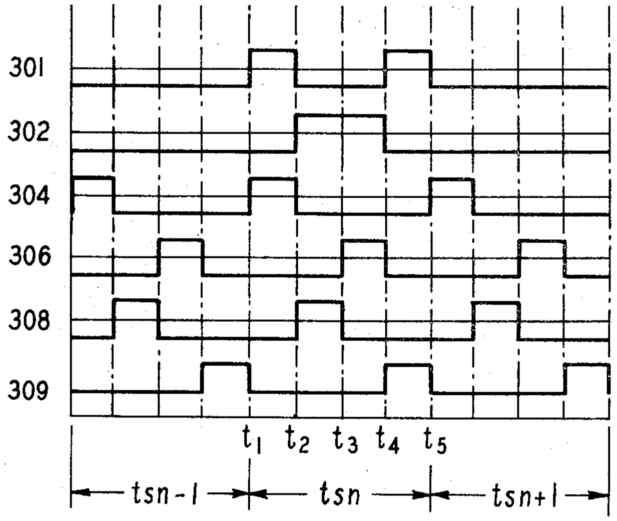
FIGS. 3A and 3B show waveforms useful in describing the time division communication system depicted in FIGS. 1 and 2.

Assume for purposes of illustration that station 1-1 is connected to station **1-*n* through coupling circuit 120-1, common buses 170 and 171, signal transfer network 117, and coupling circuit 120-n** in time slot *tsn* shown in FIG. 3A, whereby signals are exchanged between stations 1-1 and station **1-*n*. At time $t_1$ on FIG. 3, control 125 is operative to provide control signal A1 on cable 127 and control signal B on cable 129. As indicated on waveforms 301 and 304, control signals A1 and B are positive in the time interval between times $t_1$ and $t_2$. Control signal A1 is applied to switches 101-1 and 106-1 so that these switches are closed during this first time interval. During the previous repetitive time slot cycle, store 110-1 has received and stored a signal 2eon; and the signal from store 110-1 is applied to amplifier 112-1 which has unity gain. Impedance 115-1 is a line matching impedance selected to match the characteristic impedance of line 122-1 so that a signal voltage eon appears at the junction between impedance 115-1 and 122-1. It is to be understood that impedance 115-1 may be selected to provide other signal attenuation factors which may be useful in the time division communication system. The outgoing signal eo1 from station 1-1 is also applied to the junction between impedance 115-1 and line 122-1**. Thus the signal voltage *eo*1 + *eon* is applied to common bus 170 via closed switch 101-1 and lead 190 during the time interval between $t_1$ and $t_2$. Since switch 106-1 is also closed in this time interval, the signal voltage 2*eon* is applied to common bus 171 via lead 192.

subtractor 130 receives the signal voltage *eo*1 + *eon* via lead 180 and also receives signal voltage 2eon via lead 181. The subtractor, which for example may be an operational amplifier, is operative to subtract the signal applied via lead 181 from twice the signal voltage applied via lead 180 so that the subtractor output becomes signal voltage 2eo1. The subtractor output is applied to store 137 via closed switch 132 in response to control signal B shown on waveform 304.

At time $t_2$, control signals A1 and B become negative, thereby opening switches 101-1, 106-1, and 132; and control 125 provides control signal An (waveform 302) on cable 127 and control signal D (waveform 308) on cable 129. In response to control signal An, switches **101-*n* and 106-*n* are closed. Switch 150 is closed in response to control signal D. Store 110-*n*** has received and stored a signal voltage 2*eo*1 during the previously repetitive time slot cycle, and this signal is coupled through amplifier **112-*n*and matching impedance 115-*n* to the junction between the matching impedance and line 122-*n*. As described with respect to coupling circuit 120-1, the signal voltage eo1 and the outgoing signal voltage from station 1-*n***, (*eo*1 + *eon*), is applied from the junction of impedance **115-*n* and line 117-*n* to common bus 170 via closed switch 101-*n* and lead 191**. The signal voltage 2*eo*1 from store **110-*n* is applied to common bus 171 via closed switch 1061*n* and lead 194**. Consequently, the signal voltage *eon* + *eo*1 appears on lead 180 and the signal voltage 2*eo*1 appears on lead 181 and subtractor 130 provides the signal voltage 2*eon* to store 156 via closed switch 150.

At time $t_3$, control signal D becomes negative so that switch 150 is open and control signal C (waveform 306) becomes positive so that switch 144 is closed. Thus, between times $t_3$ and $t_4$, a conductive path exists from store 137 to store 110-n and the signal voltage 2*eo*1 stored in store 137 is applied via amplifier 139, closed switch 144, common bus 171 and closed switch **106-*n* to store 110-*n*. In this way, the signal voltage previously stored in store 110-*n* just before time $t_3$ is replaced by the signal voltage from store 137. Because of amplifier 139, there is no transfer of charge from store 137 to store 110-*n* and store 137 retains the charge placed therein during the time interval between times $t_1$ and $t_2$. Thus, by time $t_4$, the outgoing signal from station 1-1 has been transferred to station 1-*n***.

At time $t_4$, control signals An and C become negative and control signals A1 and E (waveform 309) become positive. Thus, switches 101-1, 106-1 and 164 are closed in the time interval between times $t_4$ and $t_5$. Between times $t_4$ and $t_5$, the signal voltage stored in store 156 is applied via amplifier 158, closed switch 164, common bus 171, lead 192 and closed switch 106-1 to store 110-1; and this signal voltage replaces the signal voltage previously stored in store 110-1. The newly stored signal in store 110-1, 2*eo*n, is coupled to station 1-1 through amplifier 112-1, matching impedance 115-1 and line 122-1 so that station 1-1 receives the signal voltage *eo*n. In this manner, the outgoing signal from station **1-*n* is transferred to station 1-1**.

Figure 2:
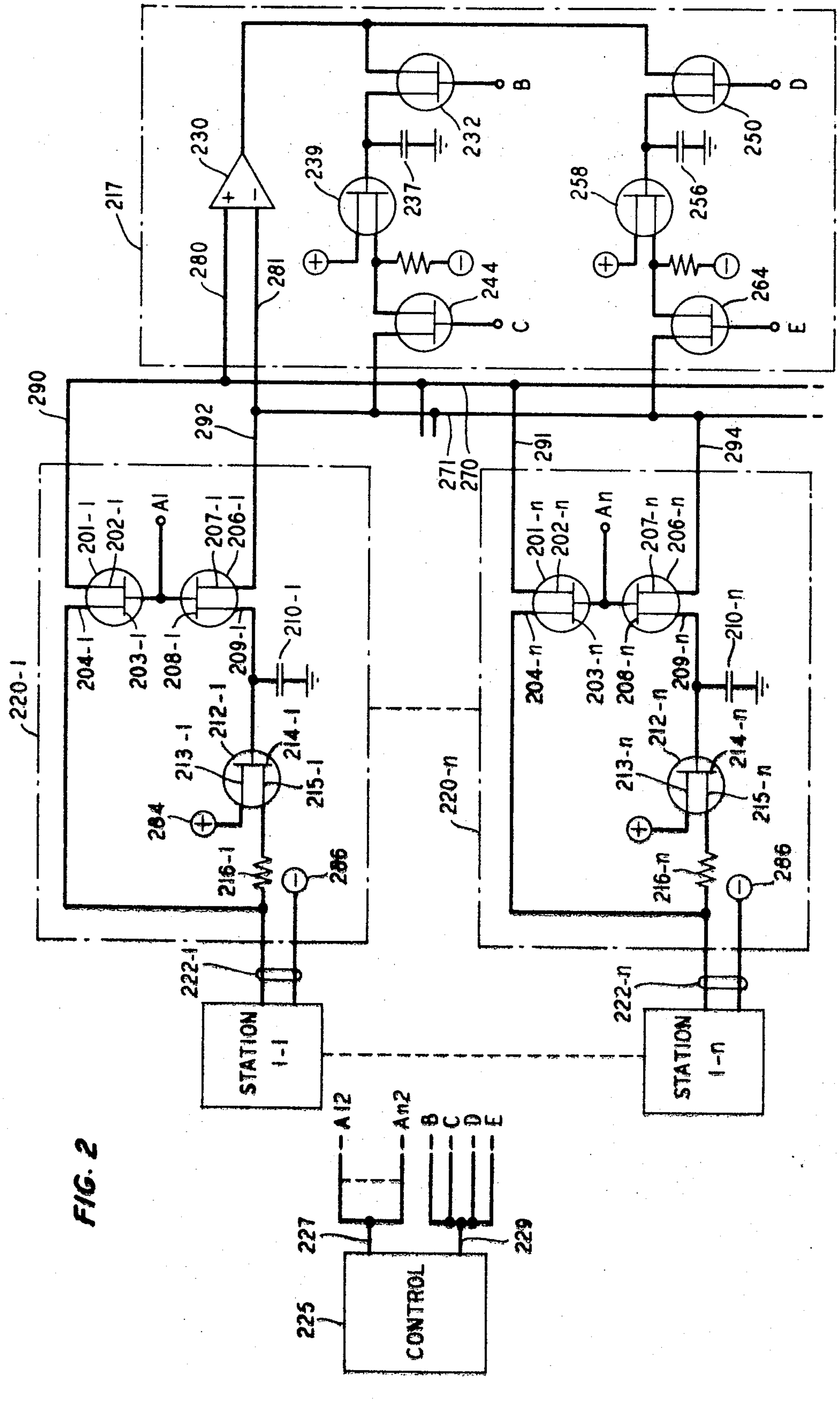
FIG. 2 depicts a detailed schematic diagram of the time division communication system shown in FIG. 1.
Figure 4:
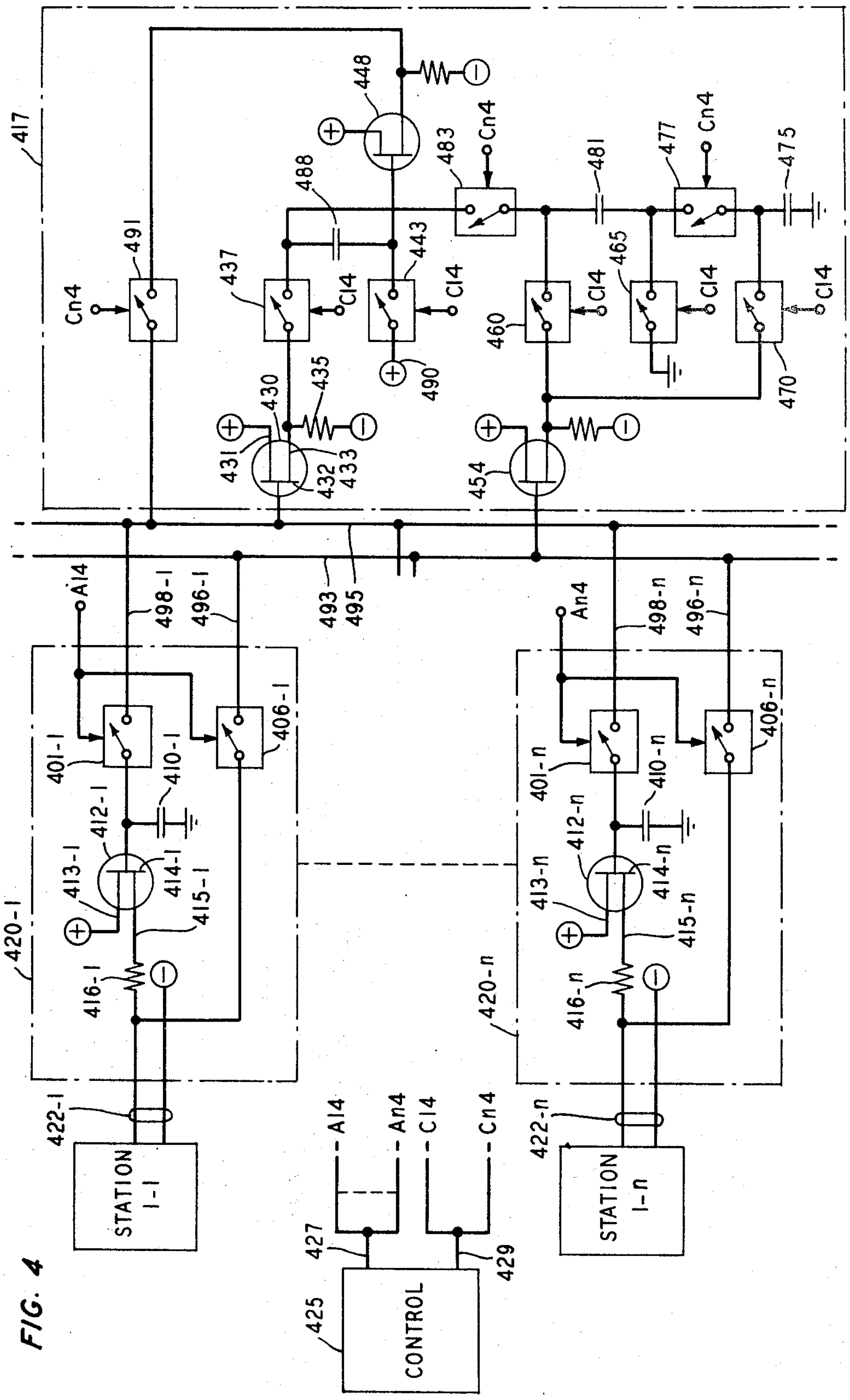
FIG. 4 depicts a block diagram of another time division communication system illustrative of my invention.
Figure 6:
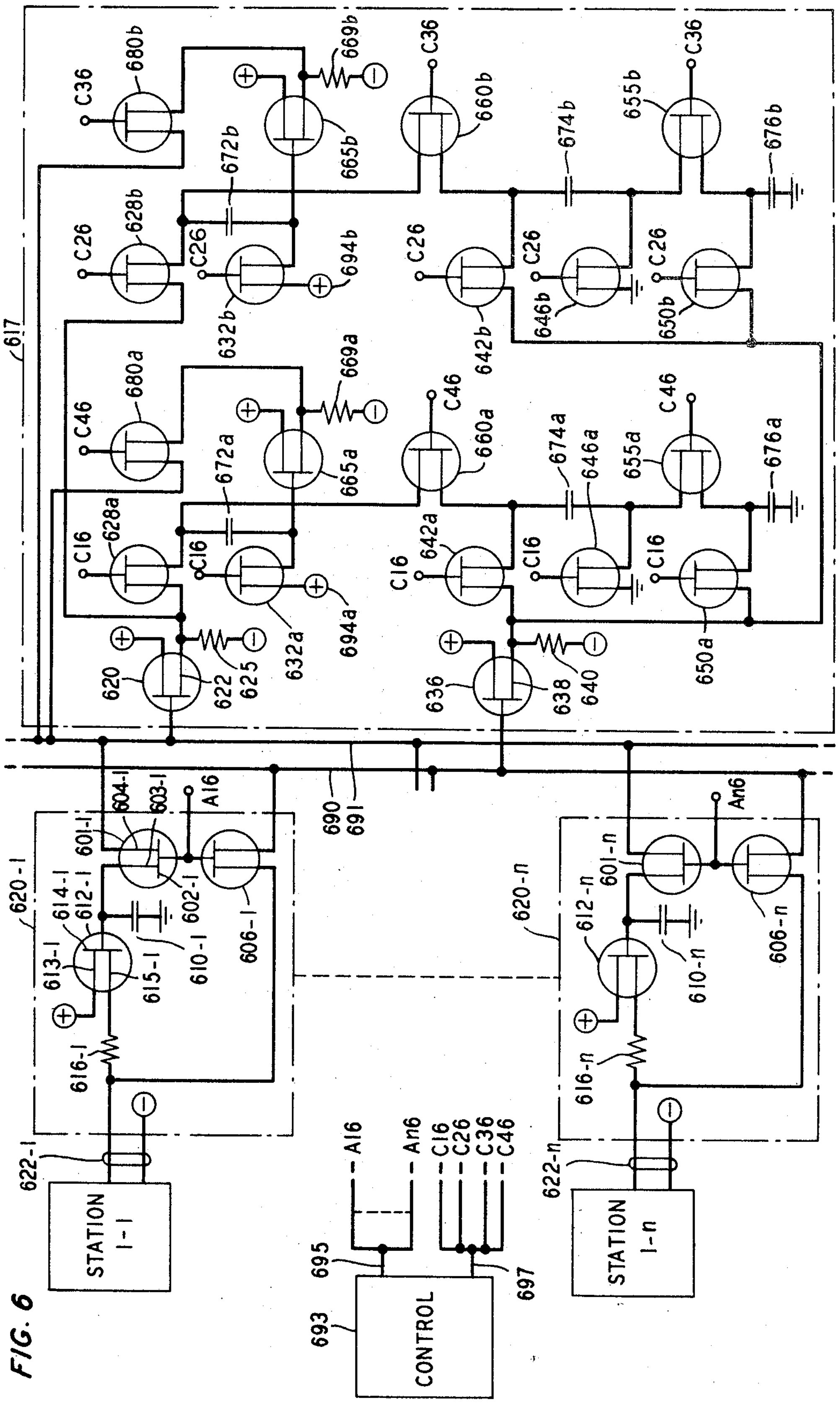
FIG. 6 depicts a schematic diagram of a time division communication system related to the block diagram of FIG. 4 and illustrative of my invention.

The time division communication system shown in the schematic diagram of FIG. 2 is substantially similar to the block diagram of FIG. 1. In FIG. 2, coupling circuit 220-1 is connected to station 1-1 via line 222-1 and is connected to common bus 270 via lead 290 and to common bus 271 via lead 292. The store in coupling circuit 220-1 is storage capacitor 210-1; the amplifier in coupling circuit 220-1 is insulated gate field effect transistor (IGFET) source follower 212-1; and the switches in coupling circuit 220-1 are IGFET transistors 201-1 and 206-1. The IGFET devices described herein with respect to FIGS. 2, 4 and 6 are *n* type IGFETs well known in the art. It is to be understood, however, the other types of IGFETs or combinations thereof may be used with appropriate changes in bias voltages and control signals. Each of the IGFET switches comprises a source electrode, a drain electrode and a gate electrode. In IGFET 201-1, for example, the control signal A1 applied to gate 203-1 determines whether or not there is a conductive path between source electrode 202-1 and drain electrode 204-1. When control signal A1 on gate 203-1 is more positive than the largest expected signal voltage and bias voltage on each of source electrode 202-1 and drain electrode 203-1, the source-drain path of IGFET 201-1 is a bidrectional conductive path. When control signal A1 is more negative than the largest negative signal voltage and bias voltage expected on each of source electrode 201-1 and drain electrode 203-1 the source-drain path of IGFET 201-1 is nonconductive. In this way, IGFET 201-1 operates as a bidirectional switch under control of control signal A1. In like manner, IGFETs 206-1, 201-*n*, 206-*n*, 232, 244, 250 and 254 also operate as bidirectional switches under control of their respective control signals.

Source follower amplifier 212-1 is biased to provide linear current amplification through positive voltage source 284 connected to drain 213-1 and negative source 286 connected to source 215-1 via line 222-1, station 1-1 and impedance 216-1. As is well known in the art, the source follower amplifier is responsive to a signal on its gate e.g. 214-1 to provide an output signal on its source to e.g. 215-1 which is somewhat less than the gate signal. The input impedance to the source follower is relatively high so that there is little or no current flow from storage capacitor 210-1 and the output impedance of the source follower is relatively low so that the load presented by matching impedance 216-1 and the devices connected thereto can be driven. Coupling circuit 220-*n* connected to station 1-*n* via line 222-*n* in like manner includes storage capacitor 210-*n*, source follower amplifier 212-n and IGFET switches 201-*n* and 206-*n*.

Referring to the waveforms shown on FIG. 3A during the time interval between $t_1$ $t_2$ of time slot tsn, control signal A1 (waveform 301) closes IGFET switches 201-1 and 206-1 whereby the signal voltage from storage capacitor 210-1 is transferred to operational amplifier 230 via lead 292, common bus 271 and lead 281. The signal from the junction between matching impedance 216-1 and line 222-1 is applied to operational amplifier 230 via closed IGFET switch 201-1, lead 290, common bus 270 and lead 280. As discussed with respect to FIG. 1, the output of amplifier 230 which corresponds to the outgoing signal from station 1-1, is applied to storage capacitor 237 via IGFET switch 232 under control of control signal B shown on waveform 304.

During the second time interval between times $t_2$ and $t_3$, the outgoing signal from station 1-*n* is similarly stored in storage capacitor 256 through closed IGFET switch 250. Control signals An and D are applied during this time interval to operate IGFET switches 201-*n*, 206-*n*, and 250. In the interval between times $t_3$ and $t_4$, only control signals An and C are applied, whereby the stored first station outgoing signal in capacitor 237 is applied to storage capacitor 210-*n* in coupling circuit 220-*n*. The signal stored in capacitor 237 is applied to the gate electrode of source follower 239 wherein it is coupled to the source electrode thereof and further coupled through closed switch 244 and closed switch 206-*n* to capacitor 210-*n*. In the fourth time interval between times $t_4$ and $t_5$ the signal stored in storage capacitor 256 is transferred to storage capacitor 210-1 under control of control signals E and A1 shown on waveforms 301 and 309, respectively, through source follower 258, closed switch 264, and closed switch 206-1.

As is well known in the art, each source follower provides a d.c. voltage drop from its gate electrode to its source electrode so that it is necessary to compensate for the d.c. offsets in each transfer path. For example, the transfer path from capacitor 210-1 through source follower 212-1 in coupling circuit 220-1, source follower 239 and source follower 212-*n* includes 3 d.c. offsets. In the circuit of FIG. 2, the compensation for the d.c. offsets is provided in amplifier 230 which in addition to amplifying the signal voltages applied thereto also provides an increase in the d.c. voltage on its output. The d.c. voltage increase is selected to compensate for the d.c. offset voltages in the source followers of the signal transfer path.

In FIGS. 1 and 2, one type of time division signal transfer has been described wherein the outgoing signal voltages from the stations are successively stored in two separate intermediate storage capacitors in the signals transfer network during the first two time intervals, and wherein the stored signal voltages in the signal transfer network are successively transferred to the receiving station coupling circuits in the next two time intervals. The time division circuit of FIG. 2 may be operated in a different manner so that only one intermediate storage capacitor is required in the signal transfer network. In this mode of operation, the outgoing signal from station 1-1 is derived in amplifier 230 during a first time interval and this outgoing signal is stored in capacitor 237. In the second time interval, the signal voltage stored in capacitor 237 is transferred to capacitor 210-*n* of coupling circuit 220-*n*. In this manner, a one direction signal transfer is accomplished. In a third time interval, the outgoing signal from station 1-*n* is produced by amplifier 230; and this signal is stored in capacitor 237. In the fourth interval the stored outgoing signal from station 1-n is transferred from capacitor 237 to capacitor 210-1 in coupling circuit 220-1.

Figure 3B:
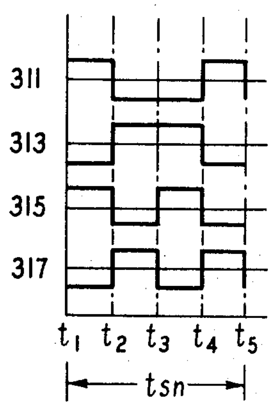

The control signal waveforms to accomplish the last mentioned type of transfer is shown in FIG. 3B. During the first time interval, between times $t_1$ and $t_2$, control signals A1 (waveform 311) and B (waveform 315) are positive, whereby switches 201-1, 206-1 and 232 are closed. As aforementioned, this causes a signal corresponding to the outgoing signal from station 1-1 to be stored in capacitor 237. During the second time interval only control signals An (waveform 313) and C (waveform 317) are positive so that the signal stored in capacitor 237 is transferred to capacitor 210-*n* through the path including closed switches 244 and 206-*n*. In the third time interval, the outgoing signal from station 1-*n* appears on the output of amplifier 230 and is stored in capacitor 237 under control of positive control signals B (waveform 315) and An (waveform 313). During the fourth time interval, the stored outgoing signal derived from station **1-*n* is transferred from storage capacitor 237 to storage capacitor 210-1 in coupling circuit 220-1 under control of positive control signals A1 (waveform 311) and C (waveform 317) via closed switches 244 and 206-1. In this way, two successive unilateral transfers are accomplished using only one intermediate storage capacitor in signal transfer network 217.**

FIG. 4 shows a time division communication system adapted to transfer signals from one of a plurality of stations to another in a time slot which includes station 1-1 through **1-*n*, coupling circuits 420-1 through 420-*n*, common buses 493 and 495, signal transfer network 417 and control 425. Coupling circuit 420-1 is connected to station 1-1 via line 422-1, and is further connected to common bus 493 via lead 496-1 and to common bus 495 via lead 498-1. Similarly coupling circuit 420-*n* is connected to station 1-*n* via line 422-*n*, to common bus 493 via lead 496-*n*, and to common bus 495 via lead 498-*n*. Each of the coupling circuits, for example 420-1, includes a storage capacitor 410-1, a source follower amplifier 412-1, a matching impedance 416-1 and IGFET switches 401-1 and 406-1.**

Figure 5:
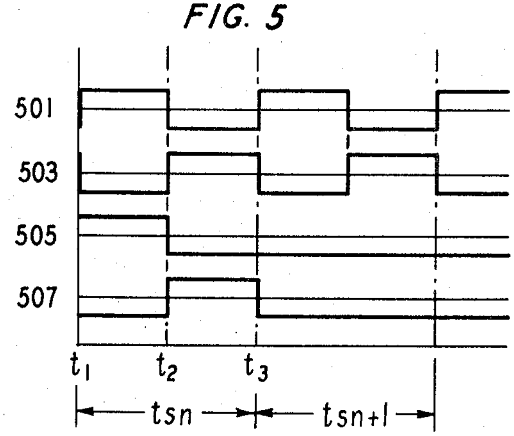
FIG. 5 shows waveforms useful in describing the time division communication system depicted in FIG. 4.

Referring to the waveforms in FIG. 5, assume for purposes of illustration a signal is transferred from station 1-1 to station **1-*n* in time slot tsn. In the first time interval between times $t_1$ and $t_2$, control 425 is operative to make control signals A14 (waveform 501) and C14 (waveforms 505) positive. Positive control signals A14 closes switches 401-1 and 406-1. In the previous repetitive time slot cycle, storage capacitor 410-1 received a signal voltage 2eon. This signal voltage is applied to gate 414-1 of source follower 412-1 and coupled therefrom to source electrode 415-1. Impedance 416-1 is adjusted to match the characteristic impedance of 422-1 so that, ideally, a signal eon is produced at the junction between impedance 416-1 and line 422-1. In practice, matching impedance 416-1 is adjusted to produce the signal eon at the junction between impedance 416-1 and line 422-1. The outgoing signal eo1 from station 1-1 is also applied to the junction between impedance 416-1 and line 422-1, so that the signal voltage $eo1 + eon$ is applied through closed switch 406-1, lead 496-1 and common bus 493 to the gate electrode of source follower 454. Since control signal C14 is positive, switches 470, 465, 460, 443 and 437 are closed in the time interval between times $t_1$ and $t_2$. Thus the output of source follower 545 whbch comprises a signal corresponding to $eo1 + eon$ is applied to each of storage capacitors 475 and 481 whereby this signal voltage is stored separately on each of these capacitors. In the same time interval, the signal voltage stored in capacitor 410-1 is applied to gate 432 of source fellower 430 via closed switch 401-1, lead 498-1 and common bus 495. Since switch 437 is closed, the signal voltage from capacitor 410-1 is applied to one terminal of capacitor 488. A bias voltage is also applied to the other terminal of capacitor 488 via switch 443 to provide an appropriate bias point for source follower 448 during the second time interval. The magnitude of the bias source voltage 490** is selected to compensate for the offset voltage drops of the source followers in the signal transfer path.

At $t_2$, the btginning of second time interval control signals A14 and C14 become negative and control signals An4 (waveform 503) and Cn4 (waveform 507) become positive so that switches 401-1, 406-1, 437, 443, 460, 465 and 470 are open during the second time interval and switches **401-*n*, 406-*n*, 477, 483 and 491 are closed. Thus, during the second time interval, capacitors 475 and 481 are connected series aiding and the output of the series aiding capacitors is connected series opposed to capacitor 488. The resulting signal voltage on the gate of source follower 448 is $2eo1 + 2eon - 2eon$, whereby the signal voltage applied to the gate of source follower 488 is $2eo1$. This signal voltage is coupled through the gate-source path of source follower 448, closed switch 491, common bus 495, lead 498-*n* and closed switch 401-*n* to storage capacitor 410-*n* wherein it replaces the signal voltage previously stored in capacitor 410-*n*. Thus, the signal voltage derived from the outgoing signal of station 1-1 and stored in capacitor 410-*n* is coupled to station 1-*n* for one repetitive cycle. In this manner, the signal transfer from station 1-1 to station 1-*n* is accomplished in two successive time intervals. It should be noted that a signal transfer from station 1-*n* to station 1-1 may be accomplished in substantially the same way during another time slot of each repetitive cycle. Alternatively, a time slot may be divided into four successive time intervals so that the signal transfer from station 1-1 to station 1-*n* is completed in the first two time intervals and the signal transfer from station 1-1 to station 1-*n*** is completed in the next succeeding two time intervals.

The time division arrangement shown in FIG. 6 provides an exchange of signals between station 1-1 and station **1-*n* in four successive time intervals of a distinct time slot and utilizes two sets of intermediate storage capacitors in signal transfer network 617. Each of coupling circuits 620-1 and 620-*n* is substantially similar to the coupling circuit described with respect to FIG. 4 and includes a storage capacitor such as storage capacitor 610-1, a source follower amplifier such as source follower 612-1, a matching impedance 616-1, and IGFET switches 601-1 and 606-1.**

Figure 7:
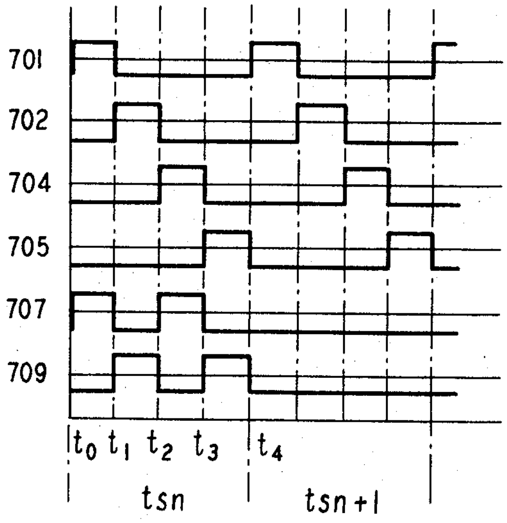
FIG. 7 shows waveforms useful in describing the time division communication system depicted in FIG. 6.

Assume that there is a signal exchange between station 1-1 and 1-n during time slot tsn of FIG. 7. During the time interval between $t_o$ and $t_1$ in time slot tsn, control 693 is operative to provide a positive control signal C16 (waveform 701) on cable 697 and a positive control signal A16 (waveform 707) on cable 695. Control signal A16 is applied to the gate electrodes of IGFET switches 601-1 and 606-1 so that these switches are closed during this first time interval. Control signal C16 (waveform 701) is applied to each of IGFET switches 628a, **632*a*, 642*a*, 646*a* and 650*a* in signal transfer circuit 617** whereby these switches are also closed in the time interval between times $t_o$ and $t_1$. In the previous repetitive time slot cycle, a signal voltage 2*eon* was stored on capacitor 610-1 in coupling circuit 620-1 so that a signal voltage *eon* and the outgoing signal voltage *eo*1 from station 1-1 appears at the junction between matching impedance 616-1 and line 622-1. This signal voltage is applied through closed IGFET switch 606-1 and common bus 690 to the gate electrode of source follower 636 and is coupled therethrough to capacitor **674*a* via source electrode 638, IGFET switch 642*a*, and IGFET switch 646*a*. It is also coupled through IGFET switch 650*a* to storage capacitor 676*a***. The signal voltage 2*eon* on storage capacitor 610-1 is applied to the gate electrode of source follower 620 via closed IGFET switch 601-1 and common bus 691. The output of source follower 620 on source electrode 622 is further applied to one lead of storage capacitor 672*a* through closed IGFET switch 628*a*. The other lead of capacitor 672*a* receives a positive bias signal from source 694*a* through closed IGFET switch 632*a*. This bias voltage is used to compensate for the d.c. offset voltage drops encountered in the source followers of the signal transfer path.

At time $t_1$, control 693 provides a positive control signal An6 (waveform 709) on cable 695 and positive control signal C26 (waveform 702) on cable 697. IGFET switches 601-*n* and 606-*n* in coupling circuit 620-*n* are closed in response to control signal An6 between times $t_1$ and $t_2$. In the previous repetitive cycle, storage capacitor 610-*n* has received the signal voltage 2*eo*1 and this signal voltage is coupled via source follower 612-*n* and impedance 616-*n* to line 622-*n*. Positive control signal C26 closes IGFET switches 628*b*, 632*b*, 642*b*, 646*b* and 650*b* so that the signal voltage *eon* + *eo*1 from the junction between impedance 616 and line 622-*n* is applied to the gate of source follower 636 via closed switch 606-*n* and common bus 690. The output of source follower 636 on source electrode 638 is applied therefrom to storage capacitor 674*b* via closed switches 642*b* and 646*b*. This signal voltage is also applied to storage capacitor 676*b* through closed switch 650*b*. The signal voltage stored on capacitor 610-*n* is applied to the gate electrode of source follower 620 through closed switch 601*n* and common bus 691 and is coupled through the gate-source path of source follower 620 to one lead of storage capacitor 672*b* through source electrode 622, and closed switch 628*b*. The other lead of storage capacitor 672*b* receives a bias signal via switch 632*b* from positive source 694*b* to compensate for source follower d.c. offset voltages in the signal transfer path.

In the third time interval between times $t_2$ and $t_3$, control signal A16 (waveform 707) and control signal C36 (waveform 704) are positive while control signal A1*n* and C26 are negative. Control signal C36 is applied to the gate electrodes of IGFET switches 655*b*, 660*b*, and 680*b* so that storage capacitor 674*b* and 676*b* are connected series aiding and the output of these capacitors is connected through closed switch 660*b* series opposing to storage capacitor 672*b*. Thus, the gate electrode of source follower 665b receives the signal voltage 2*eon* + 2*eo*1 − 2*eo*1 = 2*eon*. Signal voltage 2*eon* corresponding to the outgoing signal from station 1-*n* is then coupled through the gate-source path of source follower 665*b* and closed switch 680*b* to common bus 691. Control signal A16 is operative to close IGFET switches 601-1 and 606-1 so that the signal voltage 2eon on common bus 691 is applied to storage capacitor 610-1 throgh switch 601-1. The transferred signal voltage 2*eon* replaces the signal voltage previously stored on capacitor 610-1. Thus, at the end of the third time interval $t_3$, the signal transfer from station 1-1 to station 1-*n* is complete.

In the fourth time interval between times $t_3$ and $t_4$, control 693 is operative to provide only positive control signals A1*n* (waveform 709) and C46 (waveform 705). Control signal C46 is applied to the gate electrodes of switches 655*a*, 660*a* and 680*a* so that these IGFETs are rendered conductive and storage capacitors 674*a* and 676*a* are connected series aiding while capacitor 672*a* is connected series opposing to storage capacitors 674*a* and 676*a*. This causes the signal voltage 2*eo*1 to appear at the gate electrode of source follower 665*a*. The signal voltage 2*eo*1 corresponding to the outgoing signal voltage from station 1-1 is coupled through source follower 665*a*, closed switch 680a to common bus 691. Since control signal An6 is positive in this time interval, switch 601-*n* is closed and the signal 2eo1 is applied to storage capacitor 610-*n* wherein it replaces the signal voltage previously stored. In this way, the signal transfer from station 1-1 to station 1-*n* is completed at the end of the fourth time interval at $t_4$.

While the principles of my invention have been described in connection with specific embodiments, it is to be understood that these specific embodiments are given by way of example only and that various modifications may be made without departing from the scope and spirit of the invention. For example, the station circuits described herein are arranged to interconnect with unbalanced lines i.e., lines in which one conductor is maintained at a reference potential. Additional coupling devices may be added by techniques well known in the art so that signals between the station and the coupling circuit may be transferred on both conductors of the interconnecting line whereby a balanced transmission is accomplished.

What is claimed is:

1. A time division communication system wherein a plurality of timt slots occurs in repetitive cycles and each time slot includes at least first and second time intervals comprising a plurality of lines, first and second common buses, and a signal transfer circuit connected to said first and second common buses, each line having an associated circuit comprising signal storing means, means for coupling said stored signal to said associated line, and means for selectively connecting said associated line to said second common bus, said signal transfer circuit comprising means operative in the first time interval of a distinct time slot including means for receiving a signal from a first line circuit storing means via said first common bus, means for receiving the coupled stored signal and a signal outgoing from said first line via said second common bus, and means responsive to said signal from said first common bus and the signal from said second common bus for subtracting the signal applied via said first common bus from twice the signal applied via said second common bus, means for storing the resulting difference, and means operative in said second time interval of the distinct time slot including means for applying the resulting difference signal corresponding to the first line outgoing signal to said first common bus and means for connecting said first common bus to said second line circuit storing means.

2. A time division communication system wherein a plurality of time slots occurs in repetitive cycles and each time slot includes at least first and second time intervals comprising a plurality of lines, first and second common buses, and a signal transfer circuit connected to said first and second common buses, each line having an associated circuit comprising signal storing means, means for coupling said stored signal to said associated line, and means for selectively connecting said associated line to said second common bus, said signal transfer circuit comprising means operative in the first time interval of a distinct time slot including means for receiving a signal from a first line circuit storing means via said first common bus, means for receiving the coupled stored signal and a signal outgoing from said first line via said second common bus, first means for storing the signal received from said first common bus and second means for storing twice the signal received from said second common bus, and means operative in the second time interval of the distinct time slot including means for subtracting the first storing means signal from the second storing means signal and for applying the resulting difference corresponding to the first station outgoing signal to said first common bus, and means for connecting said first common bus to said second line circuit storing means.

3. A time division communication system wherein a plurality of time slots occurs in repetitive cycles and each time slot includes first, second, third and fourth time intervals comprising a plurality of lines, first and second common buses, and a signal transfer circuit connected to said first and second common buses, each line having an associated circuit comprising signal storing means, means for coupling said stored signal to said associated line, and means for selectively connecting said associated line to said second common bus, said signal transfer circuit comprising means operative in the first time interval of a distinct time slot including means for receiving a signal from a first line circuit storing means via said first common bus, means for receiving the coupled stored signal and a signal outgoing from said first line via said second common bus, and means responsive to said signal from said first common bus and the signal from said second common bus for storing a first distinct signal, means operative in the second time interval of said distinct time slot including means responsive to said stored first distinct signal for applying a signal corresponding to the first line outgoing signal to said first common bus and means for connecting said first common bus to said second line circuit storing means, means operative in the third time interval of said distinct time slot including means for receiving a signal from the second line circuit storing means via said first common bus, means for receiving the second line circuit coupled stored signal and a signal outgoing from said second line via said second common bus, and means responsive to the signal from said first common bus and the signal from said second common bus for storing a second distinct signal, and means operative in the fourth time interval of the distinct time slot including means responsive to said stored second distinct signal for applying a signal corresponding to the second line outgoing signal to said first common bus, and means for connecting said first common bus to said first line circuit storing means.

4. A time division communication system wherein a plurality of time slots occurs in repetitive cycles and each time slot includes first, second, third and fourth time intervals comprising a plurality of lines, first and second common buses, and a signal transfer circuit connected to said first and second common bus, each line having an associated circuit comprising signal storing means, means for coupling said stored signal to the associated line, and means for selectively connecting said associated line to the second common bus, said signal transfer circuit comprising means operative in the first time interval of a distinct time slot comprising means for receiving a signal from a first line circuit storing means via said first common bus, means for receiving the coupled stored signal and the outgoing signal from said first line via said second common bus, and first means responsive to the signal from said first common bus and the signal from said common bus for storing a first signal corresponding to the first line outgoing signal, means operative in the second time interval of said distinct time slot comprising means for receiving a signal from a second line circuit storing means via said first common bus, means for receiving the coupled stored signal and the outgoing signal from said second line via said second common bus, and second means responsive to the signal from said first common bus and the signal from the second common bus for storing a second signal corresponding to the second line outgoing signal, means operative in the third time interval of said dstinct time slot comprising means for applying said first signal from said first signal storing means to said first common bus and means for connecting said first common bus to the second line circuit storing means, and means operative in the fourth time interval of said distinct time slot comprising means for applying the second signal from said second signal storing means to said first common bus and means for connecting said first common bus to said first line circuit storing means.

5. A time division communication system according to claim 4 wherein said first signal storing means comprises means for subtracting the signal on said first common bus from twice the signal on said second common bus in said first time interval and means for storing the resultant difference, and said second signal storing means comprises means for subtracting the signal on said first common bus from twice the signal on said second common bus in said second time interval and means for storing the resulting difference.

6. A time division communication system according to claim 4, wherein said first signal storing means comprises third means for storing the signal from said first common bus and fourth means for storing twice the signal from said second common bus in said first time interval, said second signal storing means comprises fifth means for storing the signal from said first common bus and sixth means for storing twice the signal from said common bus, said applying means operative in said third time interval further comprises means connected between said third and fourth storing means and said first common bus for subtracting the third storing means signal from the fourth storing means signal, and said applying means operative in said fourth time interval further comprises means connected between said fifth and sixth storing means and said first common bus for subtracting the fifth storing means signal from the sixth storing means signal.

7. A time division communication system wherein a plurality of time slots occurs in repetitive cycles and each time slot includes first and second time intervals comprising a plurality of stations, first and second common buses, a signal transfer circuit connected to said first and second common buses for transferring signals from a first station to a second station in a distinct time slot, control means for generating first, second and third control signals, each station having an associated circuit comprising a circuit storage capacitor, first switching means responsive to the first control signal being applied to said associated circuit for connecting said first common bus to said circuit storage capacitor, amplifying means having its input connected to said storage capacitor and its output connected to said associated station, second switching means responsive to said first control signal being applied to said associated circuit for connecting the output of said amplifying means to said second common bus, said signal transfer circuit comprising a transfer storage capacitor, subtracting means having first and second inputs and an output, said first input being connected to said first common bus, said second input being connected to said second common bus, said subtracting means being operative to subtract the signal appearing on said first input from twice the signal appearing on said second input, third switching means responsive to the second control signal being applied to said signal transfer circuit for connecting said subtracting means output to said transfer storage capacitor and means connected between said transfer storage capacitor and said first common bus comprising transfer circuit amplifying means having its input connected to said transfer storage capacitor, fourth switching means responsive to said third control signal being applied to said signal transfer circuit for connecting the output of said transfer circuit amplifying means to said first common bus, means operative in the first time interval of said distinct time slot for applying said first control signal to said first station associated circuit and for applying said second control signal to said signal transfer circuit, and means operative in the second time interval of said distinct time slot for applying said third control signal to said signal transfer circuit and for applying said first control signal to said second station associated circuit.

8. A time division communication system according to claim 8 wherein each switching means comprises an insulated gate field effect transistor having a gate electrode, a source electrode and a drain electrode, the source electrode of said first switching means being connected to said first common bus, the drain electrode of said first switching means being connected to said circuit storage capacitor, and the gate electrode of said first switching means being connected to said first control signal applying means, the source electrode of said second switching means being connected to said second common bus, the drain electrode of said second switching means being connected to the output of said amplifying means, and the gate electrode of said second switching means being connected to the first control signal applying means, the source electrode of said third switching means being connected to the subtracting means output, the drain electrode of said third switching means being connected to the transfer storage capacitor, and the gate electrode of said third switching means being connected to said second control signal applying means, the source electrode of said fourth switching means being connected to the transfer circuit amplifying means output, the drain electrode of said fourth switching means being connected to the first common bus, and the gate electrode of said fourth switching means being connected to said third control signal applying means.

9. A time division communication system wherin a plurality of time slots occurs in repetitive cycles and each time slot includes first and second time intervals comprising a plurality of stations, first and second common buses, a signal transfer circuit connected to said first and second common buses for transferring a signal from a first station to a second station in a distinct time slot, control means for generating first, second and third control signals, each station having an associated circuit comprising a circuit storage capacitor, first switching means responsive to the first control signal being applied to said associated circuit for connecting said first common bus to said circuit storage capacitor, amplifying means having an input connected to said storage capacitor and an output connected to said associated station, second switching means responsive to said first control signal being applied to said associated circuit for connecting the output of said amplifying means to said second common bus, said signal transfer circuit comprising first, second, and third storage capacitors, means responsive to said second control signal being applied to said signal transfer circuit for coupling said first common bus to said first storage capacitor and for coupling said second common bus to each of said second and third storage capacitors, and means responsive to a third control signal being applied to said signal transfer circuit for serially connecting said first, second and third capacitors to subtract the signal on said first capacitor from the sum of the signals on said second and third capacitors and for coupling the signal from said series connected first, second and third capacitors to said first common bus, means operative in said first time interval for applying said first control signal to said first station associated circuit and for applying said second control signal to said signal transfer circuit, and means operative in said second time interval for applying said third control signal to said signal transfer circuit and for applying said first control signal to said second station associated circuit.

10. A time division communication system wherein a plurality of time slots occurs in repetitive cycles and each time slot includes first, second, third and fourth time intervals comprising a plurality of stations, first and second common uses, a signal transfer circuit connected to said first and second common buses for exchanging signals between a first station and a second station in a distinct time slot, each station having a circuit comprising a circuit storage capacitor and amplifying means having an input connected to said circuit storage capacitor and an output connected to said associated station, means operative in said first time interval for connecting said first station circuit storage capacitor to said first common bus and for connecting said first station circuit amplifying means output to said second common bus, means operative in said second time interval for connecting said second station cicuit storage capacitor to said first common bus and for connecting said second station amplifying means output to said second common bus, means for connecting said first station storage capacitor to said first common bus in said third time interval, means for connecting said second circuit station storage capacitor to said first common bus in said fourth time interval, said signal transfer circuit comprising subtracting means having an output, a first input connected to said first common bus and a second input connected to said second common bus for subtracting the signal on said first input from twice the signal on said second input and for applying the resultant difference signal to said output, a first transfer storage capacitor, means operative in said first time interval for applying the resultant difference signal corresponding to the outgoing signal from said first station to said first transfer storage capacitor, a second transfer storage capacitor, means operative in said second time interval for applying the resultant difference signal from said subtracting means output corresponding to the outgoing signal from said second station to said second transfer storage capacitor, means operative in said third time interval for applying the signal stored in said first transfer storage capacitor to said first common bus, and means operative in said fourth time interval for applying the signal stored in said second transfer storage capacitor to said first common bus.

11. A time division communication system wherein a plurality of time slots occurs in repetitive cycles and each time slot includes first, second, third and fourth time intervals comprising a plurality of stations, first and second common buses, a signal transfer circuit connected to said first and second commeon buses for exchanging signals between a first station and a second station in a distinct time slot, each station having a circuit comprisng a circuit storage capacitor and amplifying means having an input connected to said circuit storage capacitor and an output connected to said associated station, means operative in said first time interval for connecting said first station storage capacitor to said first common bus and for connecting said first station circuit amplifying means output to said second common bus, means operative in said second time interval for connecting said second station circuit storage capacitor to said first common bus and said second station amplifying means output to said second common bus, means for connecting said first station circuit storage capacitor to said first common bus in said third time interval, means for connecting said second station circuit storage capacitor to said first common bus in said fourth time interval, said signal transfer circuit comprising first signal transfer means for transferring a signal from said first station to said second station comprising means operative in said first time interval including first, second and third storage capacitors, means for applying the signal appearing on said first common bus in said first time interval to said first storage capacitor, means for applying the signal appearing on said second common bus in said first time interval to each of said second and third storage capacitors, and means operative in said third time interval comprising means for serially connecting said first, second and third storage capacitors to subtract the signal on said first storage capacitor from the sum of the signals on said second and third storage capacitors and means for applying the resultant difference signal from said serially connected capacitors to said first common bus, and second signal transfer means for transferring a signal from said second station to said first station comprising means operative in said second time interval including fourth, fifth and sixth storage capacitors, means for applying the signal appearing on said first common bus in said second time interval to said fourth storage capacitor and means for applying the signal appearing on said second common bus in said second time interval to each of said fifth and sixth storage capacitors, and means operative in said fourth time interval comprising means for serially connecting said fourth, fifth and sixth storage capcitators to subtract the signal on said fourth storage capacitor from the sum of the signals on said fifth and sixth storage capacitors, and means for applying the resultant difference signal from said serially connected fourth, fifth and sixth storage capacitors to said first common bus.

* * * * *